May 30, 1950    L. R. MUSKAT    2,509,836
WEIGHING AND PACKAGING APPARATUS
Filed Nov. 21, 1946
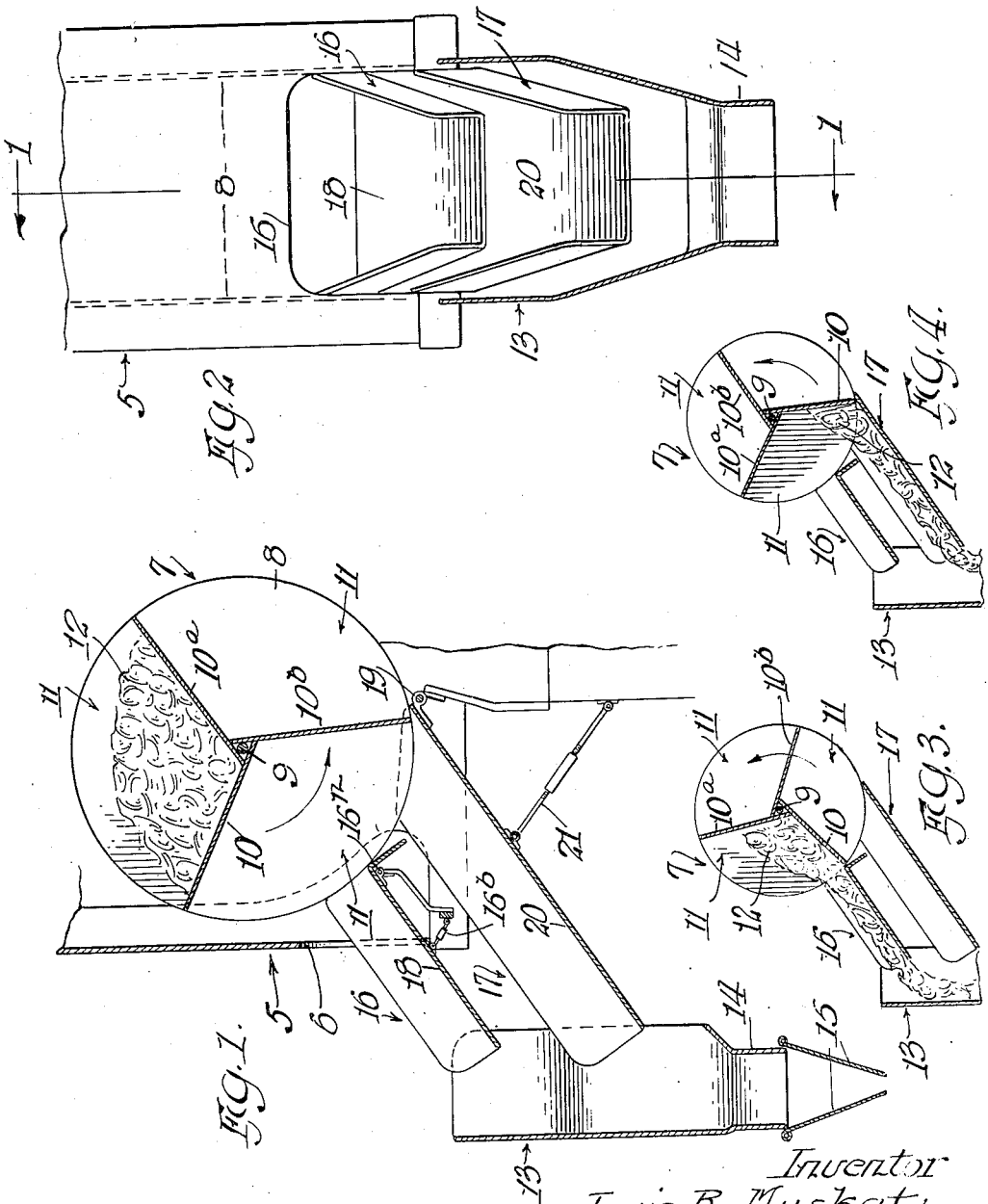
Inventor
Louis R. Muskat Patented May 30, 1950

2,509,836

UNITED STATES PATENT OFFICE 2,509,836

WEIGHING AND PACKAGING APPARATUS

Louis R. Muskat, Oak Park, Ill., assignor to Triangle Package Machinery Company, Chicago, Ill., a corporation of Illinois Application November 21, 1946, Serial No. 711,318

2 Claims. (Cl. 198—66)

This invention relates to improvements in weighing and packaging apparatus and it consists of the matters hereinafter described and more particularly pointed out in the appended claims. The invention is more especially concerned with means in such apparatus which functions in the discharge of a weighed out load of material, from the weighing mechanism thereof to a container for said material.

In weighing out fragile products, such as cookies, crackers, potato chips and other relatively large piece items in automatic weighing machines now available, and in delivering the same to containers, such products are discharged from the weighing mechanism as a stream of relatively large mass that has a substantially free fall or drop for a part of said discharge. In such a stream the individual pieces of the product tend to interlock or tangle with others and cause a choking of the apparatus. When such choking obtains the mechanism must be stopped and cleared. This results in a loss of operating time and also entails a servicing cost. Furthermore, in handling a product of this kind, as it is discharged from the weighing mechanism as a single large stream, the free fall of the product into the delivery spout caused considerable breakage of the individual pieces particularly where the container opening is small compared to the size of the individual pieces. This detracts from the appearance of the product in the container, adversely affects the appeal, and hence diminishes its sale value.

One of the objects of the invention is to provide simple and efficient means between the discharge side of the weighing mechanism and the delivery spout, which prevents choking of the discharged material and hence obviates the necessity of stopping the apparatus and clearing the product to permit further operation.

Another object of the invention is to provide in apparatus of this kind, simple and efficient means which reduces the likelihood of breakage of fragile pieces in the fall thereof into the spout that delivers the material into a container.

A further object of the invention is to provide a novel method of handling a product, composed of fragile articles, in its passage from the weighing mechanism of the apparatus to a container for the weighed material whereby choking of the material is substantially eliminated and breakage of the fragile pieces reduced to a minimum.

The above mentioned objects of the invention, as well as others, together with the advantages thereof, will more fully appear as the specification proceeds.

In the drawing:

Fig. 1 is a vertical sectional view through the improved product handling means embodying the invention and through associated parts of an automatic weighing machine, as taken on the line 1—1 of Fig. 2 and shows the weigh bucket as containing a weighed out load of the product in one of its compartments, just prior to a movement of the bucket to discharge position for said one of said compartments.

Fig. 2 is a front elevation of parts appearing in Fig. 1 with the delivery spout thereof appearing in vertical section.

Fig. 3 is a view showing parts appearing in Fig. 1 on a reduced scale and after the weigh bucket has turned through a part of its step by step movement toward its dumping position and which will be more fully mentioned later, and Fig. 4 is a view similar to Fig. 3 but shows the weigh bucket at the end of its step by step movement where final discharge of the product occurs.

Referring now in detail to that embodiment of the invention illustrated in the accompanying drawings, 5 indicates as a whole a part of the casing of an automatic weighing machine which has an opening 6 at the front thereof. In said part of said casing is located the weigh bucket 7 thereof, which includes a pair of laterally spaced circular side walls or plates 8—8 mounted upon a transverse horizontal shaft 9. Partitions 10, 10a and 10b respectively are so arranged between said walls or plates as to form a plurality of compartments 11 for the weigh bucket, each in turn adapted to receive a weighed out amount of the product 12, as best appears in Fig. 1. This weigh bucket forms a part of the weighing mechanism of the machine, and when the topmost compartment 11 has received a weighed load 12 of material, the bucket receives a step of rotative movement to move the loaded compartment from its receiving position to its dumping position and disposes another compartment in position to receive the next weighed out amount of material 12.

13 indicates a vertically disposed spout which is disposed forwardly of the weigh bucket with its top edge arranged a short distance below the bottom of the weigh bucket, as best appears in Fig. 1. This spout is of an open tubular formation at its bottom end 14 and it is open at the back and top. In instances where the spout is a vertically movable one, it may have operatively attached to its bottom end, the spreaders 15 (see Fig. 1) for opening up cartons (not shown) that include liners.

16 and 17 indicate respectively upper and lower inclinded trough like chutes disposed between the weigh bucket 7 and the spout 13. The upper chute is located in a part of the opening 6 in the casing and its upper end is so fixed that the bottom 18 thereof meets the peripheral circle of the weigh bucket at a point about midway between two of the partitions 10—10b therein, when the weigh bucket is in its product receiving position. As best appears in Fig. 1 the lower end of this chute extends into the spout 13.

The chute 16 is pivotally mounted at its upper end at 16p and is supported by an adjustable brace 16b whereby the inclination of the chute may be varied.

The lower chute is so pivotally mounted at its upper end at 19 that the upper end of its bottom 20 terminates at a point on the circle of the weigh bucket rearwardly of that partition which normally occupies a substantially vertical position, as best shown in Fig. 1. The bottom end of said chute opens into the back of the spout 13 in a plane spaced rearwardly from that of the bottom end of the upper chute. The chute 17 is supported at a point spaced from its pivot 19 from a part of the casing by a brace 21, that is adjustable in length whereby the inclination of the chute may be varied.

When the top compartment 11 of the bucket has received a weighed out amount of the product 12 therein, as appears in Fig. 1, suitable mechanism of the weighing machine operates automatically to impart a step of rotary movement (in the direction of the arrow in Fig. 1) to the bucket to the dumping position of said compartment and to bring another compartment into filling position. As the bucket is herein shown as having three compartments therein, each step of rotary movement of the bucket will be 120°. Compartmental dumping buckets of this general type are conventional and are not claimed per se in this application.

In this step movement, as the advancing partition 10 passes the horizontal plane, the product starts to flow from the bucket compartment into the upper chute 16 as appears in Fig. 3 and which chute directs the product stream flowing downwardly thereon into the top of the spout 13. When the partition 10 has passed the chute 16 the product then remaining in the bucket compartment flows down the chute 17 into a lower part of the spout 13. It is pointed out at this time that this step movement is quite rapid and that the partition 10 does not stop in the position shown in Fig. 3, and which is only a passing position.

Thus the product, as it is discharged from the bucket compartment, is divided into two streams, each of a relatively small mass which flow down the respective chutes 16 and 17 into the spout 13 for delivery into the container (not shown) placed below the restricted end of spout to receive such product.

By splitting or dividing the product discharged from the weigh bucket into streams of relatively small mass, the fragile pieces in each stream are not so apt to tangle with each other, as in a relatively large mass single stream entering the spout. Therefore choking of the bottom end of the spout is avoided. Also, by dividing the discharge into upper and lower streams of relatively small mass, the free fall effect of a large mass stream is so diminished so that breakage of the fragile pieces is reduced to a minimum.

By varying the relative angle of the chutes, the flow of the two streams may be regulated either to speed up or retard the same as may be required by the character of the product being handled. Also by positioning chute 17 at a flatter inclination than chute 16, it is possible to create a decided separation between the product streams as discharged from the two chutes 16 and 17.

As apparent from Fig. 1, the chute 16 extends further into the spout than the chute 17, so that a better separation of the stream is afforded in the spout and whereby the pieces in each stream may better separate from each other and thus avoid breaking due to impact with each other. Also, it will be noted from Fig. 1, that the upper chute is considerably shorter in length than the lower one, so that a difference of flow down said chutes is there afforded.

While in describing the invention I have referred in detail to the construction and arrangement of the parts involved, the same is to be considered only in the illustrative sense and therefore I do not wish to be limited thereto except as may be specifically set forth in the appended claims.

I claim as my invention:

1. Weighing and packaging apparatus embodying therein a rotatively mounted weigh bucket having a plurality of product receiving compartments therein, and which bucket is step by step rotated from a position wherein one of said compartments receives a weighed amount of product to a position discharging the same therefrom, a plurality of inclined chutes arranged in vertically spaced relation and operative in the discharge of the product from said one of said compartments for dividing the same into a plurality of flowing streams, at least one of said chutes being pivotally mounted, means associated with said one of said chutes for swinging the same about its pivot to change its inclination, and means into which said streams discharge for delivering the product to a predetermined position.

2. Product handling apparatus embodying therein a bucket having a plurality of compartments therein, each to receive a product batch and which bucket is rotatable about a horizontal axis from a batch receiving to a batch dumping position for each of said compartments, means having batch receiving and discharge ends, and a plurality of vertically spaced troughs disposed between said bucket and the product receiving end of said means and arranged with their upper and lower ends at different elevations and at that inclination providing a gravity flow of the product thereon, the upper end of each trough being positioned each to receive a portion of each product batch from each compartment as it moves to dumping position, the lower end of each trough being disposed to direct each batch portion thereon individually into the product receiving end of said means.

LOUIS R. MUSKAT.

REFERENCES CITED

The following references are of record in the file of this patent:

UNITED STATES PATENTS

| Number | Name | Date |
|---|---|---|
| 672,409 | Scheidegger | Apr. 16, 1901 |
| 760,555 | Owen | May 24, 1904 |
| 778,301 | Burdick | Dec. 27, 1904 |
| 1,120,299 | Fleming | Dec. 8, 1914 |
| 1,220,249 | McWhorter | Mar. 27, 1917 |
| 1,369,968 | Draver | Mar. 1, 1921 |
| 1,494,271 | Miller | May 13, 1924 |
| 1,524,334 | Brown | Jan. 27, 1925 |
| 1,580,176 | Stone | Apr. 13, 1926 |
| 2,334,368 | Wolf | Nov. 16, 1943 |